United States Patent [19]
Jereb et al.

[11] Patent Number: 5,388,467
[45] Date of Patent: Feb. 14, 1995

[54] AUTOMATIC SWITCH TEST STATION

[75] Inventors: John Jereb, Dundee; John Stark, Bartlett; Gerald Proszek, Buffalo Grove, all of Ill.

[73] Assignee: Tricor Systems, Inc., Elgin, Ill.

[21] Appl. No.: 942,519

[22] Filed: Sep. 9, 1992

[51] Int. Cl.[6] .............................................. G01L 5/00
[52] U.S. Cl. ................... 73/862.381; 324/415
[58] Field of Search ............... 324/422, 423, 415, 418; 73/862.381, 862.541

[56] References Cited

U.S. PATENT DOCUMENTS

| | | | |
|---|---|---|---|
| 2,852,736 | 9/1958 | Spahn, Jr. ............................. | 324/423 |
| 2,864,054 | 12/1958 | Boyle et al. ......................... | 324/423 |
| 3,723,867 | 3/1973 | Canarutto ............................ | 324/73 |
| 3,854,125 | 12/1974 | Ehling et al. ....................... | 340/172.5 |
| 4,147,977 | 4/1979 | Dimmick ............................... | 324/418 |
| 4,311,961 | 1/1982 | Holt et al. .......................... | 324/418 |
| 4,491,797 | 1/1985 | Velsher ............................... | 324/421 |
| 4,672,310 | 6/1987 | Sayed ................................. | 324/422 |
| 4,712,071 | 12/1987 | Charbonneau et asl. ............ | 324/415 |
| 4,854,165 | 8/1989 | Jay ..................................... | 73/168 |
| 4,897,754 | 1/1990 | Konishi et al. ...................... | 361/1 |
| 4,926,118 | 5/1990 | O'Connor et al. ................... | 324/158 |
| 4,934,399 | 6/1990 | Cho .................................... | 137/14 |
| 4,976,144 | 12/1990 | Fitzgerald ........................... | 73/168 |
| 5,117,189 | 5/1992 | Terminiello et al. ................ | 324/415 |
| 5,182,517 | 1/1993 | Thelen et al. ....................... | 324/418 |

FOREIGN PATENT DOCUMENTS 0705557  12/1979  U.S.S.R. ............................ 324/422

*Primary Examiner*—Richard E. Chilcot, Jr.
*Assistant Examiner*—R. Biegel
*Attorney, Agent, or Firm*—Marshall, O'Toole, Gerstein, Murray & Borun

[57] ABSTRACT

An apparatus and method for testing a switch having an actuating plunger, the switch undergoing a switch event in response to the actuation of the actuating plunger includes a switch nest and clamp assembly for holding the switch at a precise and predetermined location and a motor driven plunger actuator for applying force to the plunger thereby to actuate the switch. The switch test station further includes a pressure sensor coupled to the plunger actuator which measures the force being applied to the plunger during switch actuation. An electrical sensor couples to the switch nest and measures the electrical characteristics of the switch while a microcomputer responsive to the pressure sensor and the electrical sensor determines the mechanical displacement of the actuating plunger at a switch event.

23 Claims, 9 Drawing Sheets

AUTOMATIC SWITCH TEST STATION

TECHNICAL FIELD

The present invention relates generally to electrical component test stations, and more particularly to test stations for testing force activated switches such as snap-acting switches.

BACKGROUND ART

For many years, switches were considered simplistic devices with the crudest of parametric characteristics. However, applications for switches, such as snap-acting switches, are becoming more exacting and, accordingly, switch users and makers are requiring more precise and accurate switches. Thus, more stringent quality control procedures and manufacturing standards are being implemented both to produce switches which can be used in these more exacting applications and to increase the manufacturing productivity of these switches.

A typical snap-acting switch has a movable contact actuated between a normally closed position and a normally open position upon movement of a switch plunger. Such a switch has an operate point or operating position, which is the point along a displacement axis with respect to a reference point at which the movable contact of the switch transfers from one of its positions (i.e., the starting position) to the other of its positions, and a reset point, which is the point along the displacement axis with respect to the reference point at which movable contact of the switch transfers back to its starting position.

In precision measuring operations, it is imperative to know the precise location of the operate and reset points along with other switch and plunger characteristics such as switch contact resistances, plunger force characteristics, and plunger travel characteristics. Thus, when manufacturing switches, it is important to assure that the switch, as manufactured, falls within required customer specifications for each of the switch characteristics. To do this in a simple, quick and efficient manner, a switch test station which automatically tests for each of the desired switch characteristics and determines if the switch falls within predetermined specifications is required.

An example of a known test station is disclosed in Terminiello, et al., U.S. Pat. No. 5,117,189 which describes a computer controlled test station which automatically loads a switch into an activating position and applies pressure to the switch plunger to thereby actuate the switch. This test station measures the movement hysteresis of the switch, i.e., the relative distance between the displacement of the switch plunger when the movable contact of the switch is at the operate point of the switch and the displacement of the switch plunger when the movable contact of the switch is at the reset point. This test station also measures switch deadbreak, i.e., the amount of time it takes the movable contact of the switch to move between the normally closed and the normally open positions. The test station then sorts the switches into separate bins according to the results of the two tests described above.

Single test, switch testing devices are also known. An example of such a device is described in Jay, U.S. Pat. No. 4,854,165. The device disclosed therein tests pneumatically actuated switches in order to determine the exact amount of fluid pressure needed to actuate the switch. Another single test, switch testing device, shown in Velsher, U.S. Pat. No. 4,491,797, includes a test circuit for precisely measuring the contact resistance of dry circuit contacts. This test circuit supplies a precise current through the switch contacts while measuring the voltage across the contacts so as to determine the contact resistance.

No one of these known switch test devices is capable of measuring the many switch characteristics which are required for switches used in current applications. Moreover, none of these known switch test devices measures these plural switch characteristics during a single switch actuation cycle. Furthermore, presently known test devices cannot universally test different types of switches, but rather are dedicated to only a specific switch type. Known switch test devices cannot test all channels of a multiple channel switch during a single switch actuation cycle and are imprecise.

SUMMARY OF THE INVENTION

These disadvantages are substantially overcome by the present invention. Thus, in accordance with one aspect of the present invention, an apparatus for testing a switch having a switch plunger, wherein the switch undergoes a switch event in response to actuation of the switch plunger, includes means for holding a switch at a predetermined location, means for applying a force to the switch plunger of the switch, means for sensing the force supplied to the switch plunger during switch actuation, and means for determining the mechanical displacement of the switch plunger at a switch event.

Preferably, the switch testing apparatus further includes coupling and electrical characteristic measuring means for coupling to the switch and for measuring electrical characteristics of the switch during actuation of the switch plunger. The coupling and electrical characteristic measuring means may include a signal source adapted to be coupled to the switch to provide an electrical signal to the switch, and a sensor adapted to be coupled to the switch to measure the electrical resistance properties of the switch. More particularly, the coupling and electrical characteristic measuring means includes a kelvin socket for connecting the signal source and the sensor to the switch to enable highly accurate resistance measurements. Also, preferably, the electrical characteristic measuring means may be arranged to measure the minimum, maximum and average electrical resistance of the switch during actuation of the switch plunger.

Also, preferably, the mechanical displacement determining means may automatically correct for displacement errors resulting from the force/displacement characteristic of the force supplying means. In a highly preferred embodiment, the invention includes means for detecting the force/displacement curve of the force applying means.

Still further, according to this aspect of the present invention, the force applying means may include a stepper motor which drives a force transducer to apply force to the switch plunger in an incremental manner and the electrical characteristic measuring means may measure data for each displacement increment. In this embodiment, a determining means uses the data measured by the coupling and electrical characteristic measuring means to recognize an occurrence of a switch event. In this manner, the mechanical displacement of the actuating plunger is determined at that event.

In another highly preferred embodiment of the invention, the coupling and electrical characteristic measuring means measures electrical characteristics for any number of channels of the switch and the mechanical determining means determines mechanical displacement of the actuating plunger with respect to any number of channels of the switch.

According to another aspect of the present invention, an apparatus for testing a switch having a switch input port, a switch output port, and at least one contact movable to interconnect the switch input port and the switch output port includes means for holding the switch in a predetermined location, means for applying a force to the switch to actuate the contact, means for measuring the force applied to the switch, means for supplying a first electrical signal to the switch, and means for detecting a second electrical signal from the switch. A determining means is included to determine switch characteristics based upon the force applied to the switch and at least one of the electrical signals.

In this aspect of the invention, the supplying means may include a signal source for providing an electrical signal to the switch, and the detecting means may include a sensor for measuring electrical resistance properties of the switch. Also, a detecting means may include a kelvin socket to enable more accurate resistance measurements. Minimum, maximum and average-electrical resistances of the switch during the switch activation may also be measured.

According to another aspect of the invention, an apparatus for testing a switch having a movable contact comprises means for holding the switch in a predetermined location, means for actuating the movable contact, and means for measuring multiple switch parameters including switch contact resistance, switch operate point, and switch operate force, and also, if desired, switch travel, free position of the switch, movement differential of the switch, inward and outward blackout, actuation windows of the switch, and the simultaneity of multiple movable contacts of the switch.

According to still another aspect of the present invention, an apparatus for testing a switch having a switch plunger, at least one mounting hole, and a movable contact responsive to the switch plunger comprises means for engaging the switch through the mounting hole so that the switch is held in a predetermined precise position, means for applying a force to the switch plunger to actuate the movable contact, and means for determining the displacement of the switch plunger with respect to the mounting hole during plunger actuation.

In this aspect of the invention, the engaging means may include a slidable cylindrical pin having an end tapered along an axis of the pin, the tapered end being capable of insertion into the mounting hole of the switch so that the pin engages the housing of the switch and so that axis of the pin intersects the center of the mounting hole. Also, the engaging means may includes a movable clamp for applying pressure to the switch which, in conjunction with the slidable cylindrical pin, holds the switch substantially immovable at a predetermined location.

According to another aspect of the invention, a switch testing apparatus includes nest accepting means for accepting one of a plurality of interchangeable nest assemblies, each nest assembly being arranged to accept a particular type of switch and including standardized input and output ports and means for connecting the standardized input and output ports to the switch. The switch testing apparatus also includes actuating means for actuating a switch in a nest assembly when the nest assembly is positioned in the nest accepting means, holding means for holding the switch in a predetermined location with reference to the actuating means, and means coupled to the nest assembly input and output ports and to the actuating means for measuring switch characteristics during a switch actuation cycle.

According to another aspect of the present invention, an apparatus for testing a switch having up to eight channels includes means for holding a switch in a predetermined location, means for actuating the actuating plunger of the switch, and means for measuring the switch characteristics associated with each channel of the switch during a single plunger actuation cycle.

According to yet another aspect of the invention, a method of testing a switch, wherein the switch has an input port, an output port, and at least one contact movable to interconnect the input port and the output port, includes the steps of holding the switch in a predetermined location, actuating the switch with a force, measuring the force applied to the switch during actuation, applying a first electrical signal to the switch, sensing a second electrical signal from the switch, and determining switch characteristics from at least one of the first and second electrical signals and from the force applied to the switch.

BRIEF DESCRIPTION OF THE DRAWING

These and other features and advantages will become more apparent from a detailed consideration of the invention when taken in conjunction with the drawing in which.

DESCRIPTION OF THE PREFERRED EMBODIMENTS

Figure 1:
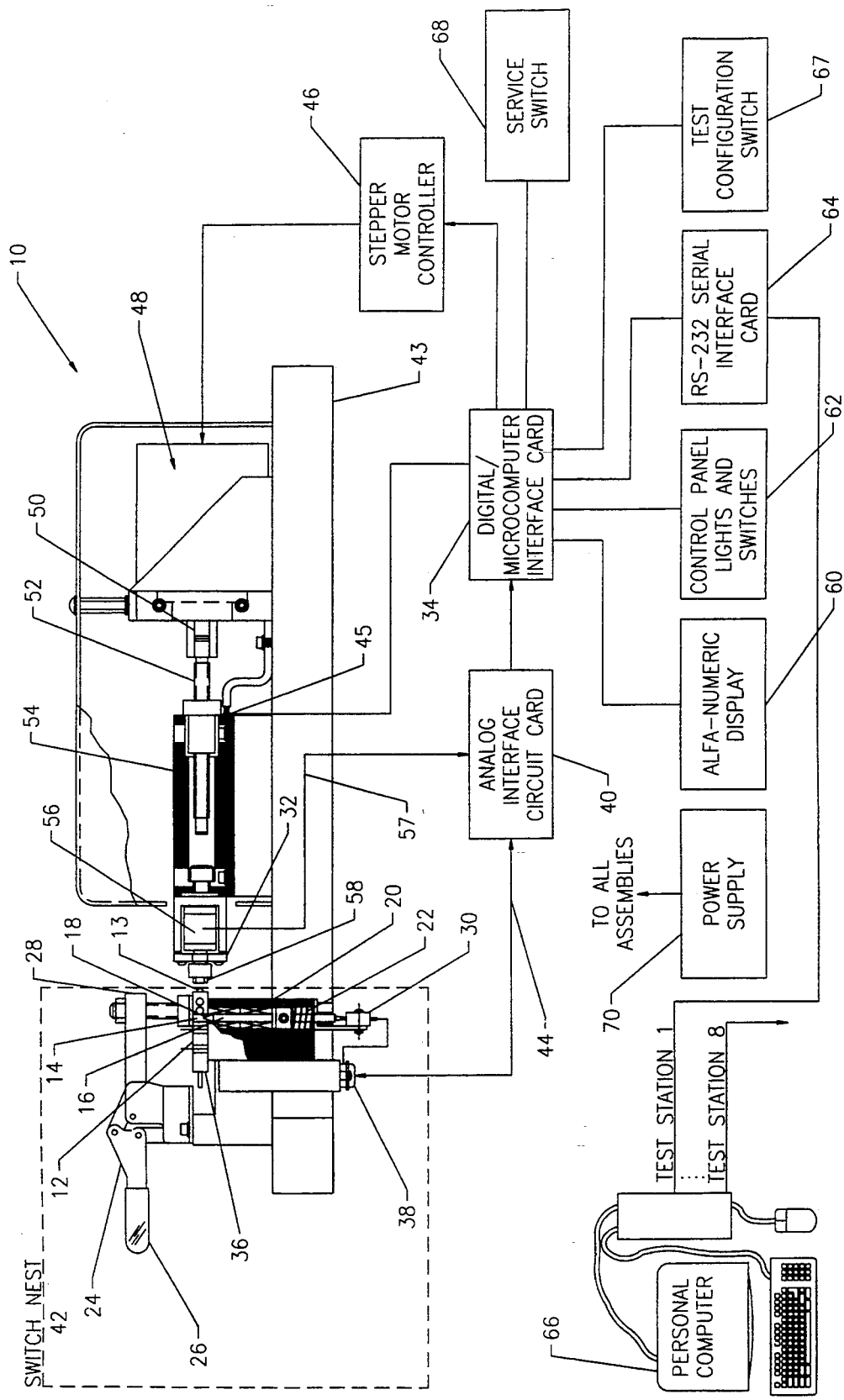
FIG. 1 is a diagram of the switch testing device according to the present invention.

Shown in FIG. 1 is an automatic switch test station (ASTS) 10 according to the present invention. A switch 12 to be tested by the ASTS 10 includes a switch plunger 13 and a pair of mounting holes 14 only one of which is shown in FIG. 1, it being understood that the other mounting hole is directly behind the one mounting hole shown in FIG. 1. The switch 12 is held in a fixed and predetermined location by sliding a pair of precision guide pins 16, only one of which is shown in FIG. 1, it being understood that the other guide pin is directly behind the one guide pin shown in FIG. 1, into the corresponding mounting holes 14. Each guide pin 16 has a precision tapered end 18 to accommodate insertion of a guide pin 16 into a mounting hole 14. Each of the guide pins 16 has a circumference which allows the guide pin tapered end 18 to fit snugly against the edges of the mounting holes 14 when the guide pin 16 is aligned with its corresponding mounting hole 14. The guide pins 16 slide in near zero clearance ball bushings 20 such that the axes of the guide pins 16 are located in predetermined precise positions. The guide pins 16 rest on corresponding springs 22 which force the guide pins 16 up towards the mounting holes 14 of the switch 12. Thus, when the switch 12 is inserted onto the ASTS 10, the tapered ends 18 of the guide pins 16 seek the centers of the mounting holes 14 so that the switch 12 is positioned in a precise and known location.

A switch clamp 24 is also included having a handle 26 and a pressure assembly 28 which applies pressure to the switch 12 upon lowering of the handle 26 to the position shown in FIG. 1. In this manner, when the handle 26 of switch clamp 24 is moved into the closed position (as shown in FIG. 1), the pressure assembly 28 contacts the switch 12 to force it down onto the spring loaded guide pins 16 thereby holding the switch 12 which is aligned on the guide pins 16 in a predetermined location and preventing movement of the switch 12.

When the handle 26 is lowered and the guide pin 16 accordingly compresses the spring 22, a switch insert sense 30 sends a signal through an interface connector 38 to a digital/microcomputer interface card 34 indicating that the switch 12 is properly inserted into the ASTS 10.

When inserted, the switch 12, which can have up to eight channels, i.e., inputs or outputs, is electrically connected through a kelvin socket 36 to the interface connector 38. The interface connector 38 and the kelvin socket 36 electrically connect the inputs and outputs of the switch 12 to an analog interface circuit card 40 through an interconnect 44 having a plurality of input/output lines. In this manner, the analog interface circuit card 40 supplies electrical input signals to, and accepts electrical outputs from, the switch 12 as described below with reference to FIG. 3.

The interface connector 38, the kelvin socket 36, the switch clamp 24, the sliding precision guide pin 16, the spring 22, and the switch insert sense 30 all comprise a switch nest 42. The switch nest 42 is removably fastened, as by bolts for example, to a platform 43 and is configured for a particular type of switch. Specifically, the configuration of the guide pins 16, the kelvin socket 36, the interface connector 38, and the clamp 24 are all switch dependent so that each switch to be tested requires a unique combination of these elements in the switch nest 42. Thus, to test a different type of switch, the switch nest 42 is replaced with a different switch nest configured for the new type of switch to be tested. In the preferred embodiment, the switch nest 42 includes the switch clamp 24; however, it is possible to configure the ASTS 10 such that the switch clamp 24 is not part of the removable switch nest 42. In the preferred embodiment, the switch nest 42 is capable of accepting switches requiring up to eight channels, i.e., having eight inputs or outputs for eight sets of stationary contacts. Thus, the switch nest 42 can be configured to test single or multiple channel standard switch types denoted as A, B, C, X, Y and Z. The interconnect 44 has up to thirty-two switch input/output lines, sixteen of which connect input and return current from the analog interface circuit card 40 to the interface connector 38 for supply to the corresponding channels of the switch 12 and sixteen of which transmit differential sense signals to the analog interface circuit card 40 from the interface connector 38 corresponding to the channels of the switch 12. The interconnect 44 also includes a line connecting the switch insert sense 30 to the analog interface card 40 and a digital interconnect which transmits a hardwired nest code from the interface connector 38 through the analog interface card 40 to the digital/microcomputer interface card 34. The nest code identifies the switch nest being used in a given test and will be more fully discussed hereinbelow.

The ASTS 10 also has a switch actuation mechanism including a stepper motor controller 46 (which may be a Bodine THD-1801B controller), a stepper motor 48 suitably secured to the platform 43, a motor shaft 50, a precision lead screw 52, a ball slide 54, a pressure sensor 56 connected to the analog interface circuit card 40 by a cable 57, a pressure sensor stop mechanism 55, and a plunger actuator 58. In operation, the digital/microcomputer interface card 34 sends a drive signal to the stepper motor controller 46 which directs the stepper motor 48 to move one incremental amount. This in turn drives the precision lead screw 52 and the ball slide unit 54, which act as a force transducer, to force the plunger actuator 58 a predetermined translational distance. In the preferred embodiment, the lead screw 52 and the stepper motor 48 combine to produce a translational stepping resolution of 0.0001 inch/step. The pressure sensor 56, which is located on the end of ball slide unit 54, senses the pressure applied by the plunger actuator 58 to the switch plunger 13 and transmits a signal indicative of this pressure to the digital/microcomputer interface card 34 via the analog interface circuit card 40.

In case of improper operation, the pressure sensor Stop mechanism 55 prevents damage to the pressure sensor 56. In normal operation, the plunger actuator 58 travels through the center of the stop mechanism 55 exerting a force on the pressure sensor 56 causing it to deflect. When the force becomes too great, the pressure sensor 56 deflects an amount which allows an outer edge of the plunger actuator 58 to contact the stop mechanism 55 to prevent further deflection and subsequent damage to the pressure sensor 56.

A precision reference switch 59 is used to establish an accurate start point for the switch actuation mechanism. This switch 59 is a sensor used in the calibration mode to mechanically calibrate the distance measuring hardware.

Thus, when a switch 12 is loaded in the switch nest 42, the switch insert sense 30 notifies the digital/microcomputer interface card 34 through the analog interface card 40 that the switch 12 is ready to be tested. The digital/microcomputer interface card 34 then controls the stepper motor controller 46 to drive the stepper motor 48 in incremental steps until the plunger actuator 58 comes in contact with the switch plunger 13. At this point, the pressure sensor 56 senses a higher pressure on the plunger actuator 58 thereby indicating that the plunger actuator 58 is in contact with the switch plunger 13 at the free position. At this free position, the digital/microcomputer interface card 34 controls the stepper motor controller 46 to continue to increment stepper motor 48 in individual incremental steps which forces the switch plunger 13 to be "depressed" in incremental steps of approximately 0.0001 inch. After each incremental step of the stepper motor 48, electrical measurements are made through the kelvin socket 36, the interface connector 38, and the analog interface circuit card 40, as described below in conjunction with FIG. 2. The pressure sensor 56 also delivers force data to the digital/microcomputer interface card 34 after each incremental step of the stepper motor 48.

When the pressure sensor 56 senses a predetermined pressure indicating that the switch plunger 13 has reached its "bottom out" position, i.e., where the switch plunger 13 can no longer be depressed, the digital/microcomputer interface card 34 controls the stepper motor controller 46 to drive the stepper motor 48 in the opposite direction, thereby allowing the switch plunger 13 to return to its free position. Once again, force and electrical measurements are read by the digital/microcomputer interface card 34 after each step during this return travel of the switch plunger 13. In this manner, the force and electrical characteristics of the switch are determined and, when analyzed in conjunction with the known physical displacement of the switch plunger 13, the switch actuation points (i.e., switch events) of the switch 12 can be determined. These switch events include, for example, the free position, the operate point, the bottom out point, and the reset point.

The actual switch parameters tested for the inward motion (see FIG. 2) include the switch-free position, the pretravel, the operate force, the operate point, the actuation window, the bottom out point, and the over travel of the switch. For outward motion, the parameters include the reset point, the reset force, the actuation window, and the reset travel of the switch. Movement differential, blackout, and simultaneity of the switch are also tested as defined in FIG. 2.

Figure 2:
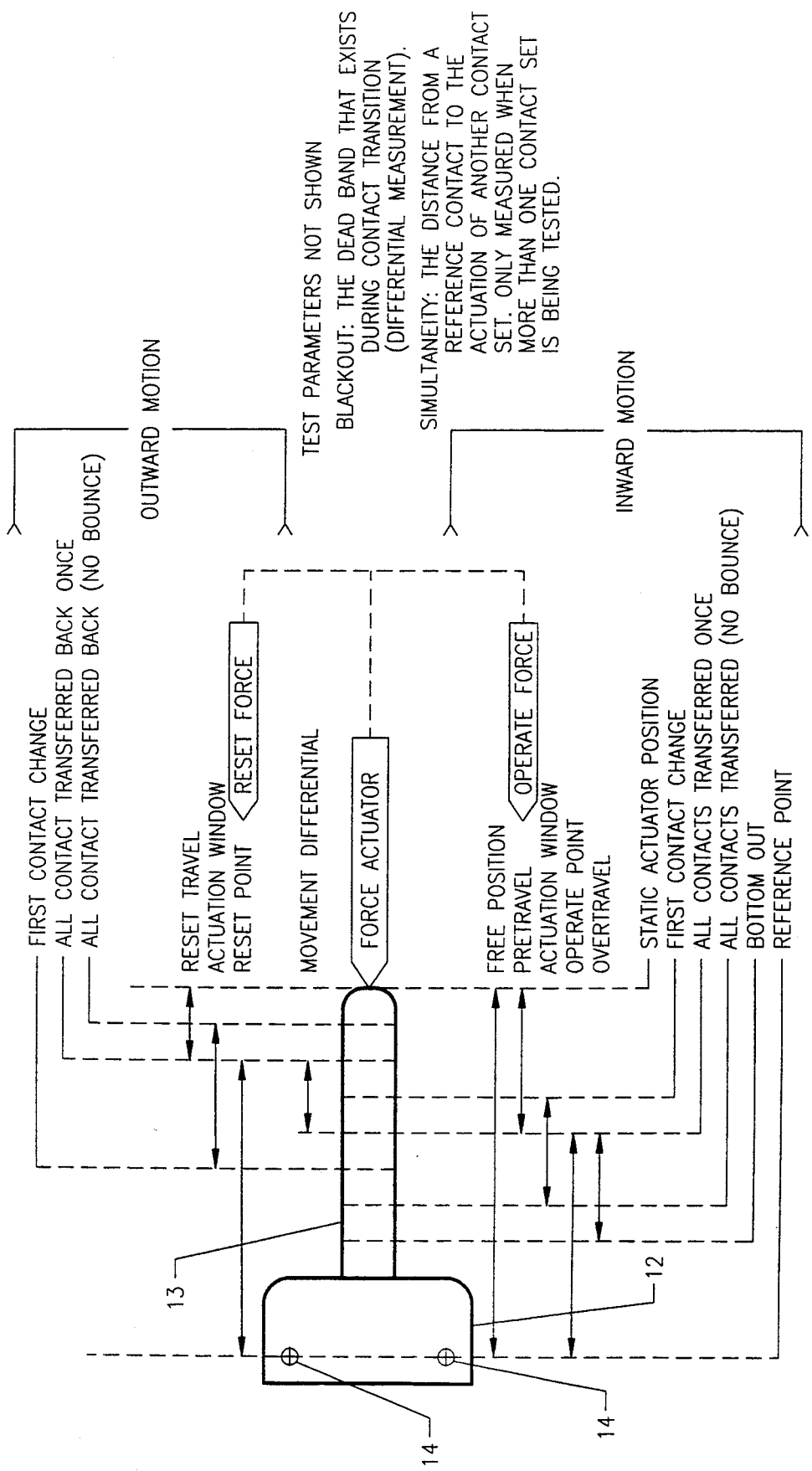
FIG. 2 is a diagram illustrating selected displacement points and test parameters of a switch to be tested by the switch testing device of FIG. 1.

All the distance test parameters are shown in FIG. 2 in relation to displacement of the switch plunger 13. Displacement is measured from either a switch reference point which may be a calibrated reference point or a differential measurement of two points. For example, the operate point is that point along the displacement axis of the plunger 13 at which the movable contact of the switch 12 transfers from one of its positions (a starting position) to its other position. The bottom out point is the point along the displacement axis where the switch plunger 13 can no longer be displaced by the plunger actuator 58. Bottom out occurs when a preset maximum allowable force is sensed by the force sensor 56 or when the pressure actuator 58 has been advanced inwardly 2500 incremental steps. The reset point is that point along the displacement axis at which the movable contact of the switch 12 transfers back to its starting position. The free position is the point along the displacement axis where the switch plunger 13 first resists the plunger actuator 58, i.e., where the pressure sensor 56 first detects a force applied by the plunger actuator 58 on the switch plunger 13. Pretravel is the distance from the free position to the point where all contacts have transferred at least once while reset travel is the distance between the point where all contacts have transferred back at least once to the free position. The actuation window is a differential measurement between where the first contact changes to where all contacts have changed and no bounce occurs. Over travel is the distance between the point at which all contacts have transferred once and the bottom out position. Blackout is a differential measurement of the distance that the switch plunger 13 travels in transferring a movable contact from one of its positions to the other of its positions. Thus, it is the deadband that exists during contact transition. Simultaneity is a differential measurement of the plunger 13 travel distance from a reference contact to the plunger 13 position upon actuation of another contact set. This parameter is only measured when a switch under test has more than one contact set. Normally, contact transfer is detected by sensing the transfer of current flow from one contact to another contact of a contact set. For a single channel switch, such as a single pole, single throw switch, transfer is determined when current flows or ceases to flow through the contact. As such, blackout and simultaneity are not determined for single pole, single throw switches.

Upon analyzing the electrical, displacement and force data, the digital/microcomputer interface card 34 interacts with an alphanumeric display 60 and a control panel 62 to inform the operator as to the type of switch being tested, whether the switch passed or failed, and the particular test results.

The digital/microcomputer interface card 34 is also connected through an RS-232 serial interface card 64 to a personal computer (PC) 66. The PC 66 can be used, if desired, to configure the ASTS 10 and is capable of uploading specific switch test criteria for different switch types or configurations. The PC 66 also can be used, if desired, to download resulting test data for analysis, review or printing.

A test configuration switch 67 serves as an input to the digital microcomputer interface card 34 and, in the preferred embodiment, comprises a 16 setting switch which allows the operator to choose 1 of 16 different switch test configurations relating to each of the switches that can be tested by the ASTS 10. The test configuration switch 67 selects one of the sixteen test criteria (parameters) that were previously uploaded by the PC 66. A rear mounted service mode switch 68, when activated, provides a means to test and adjust the pressure sensor 56 zero offset, the absolute pressure sensor gain, the exact current source levels, and resistance channel sense amplifier offsets. These are performed under manual control and will be discussed more fully below. A power supply 70 provides operating power to all electrical assemblies of the ASTS 10.

Figure 3:
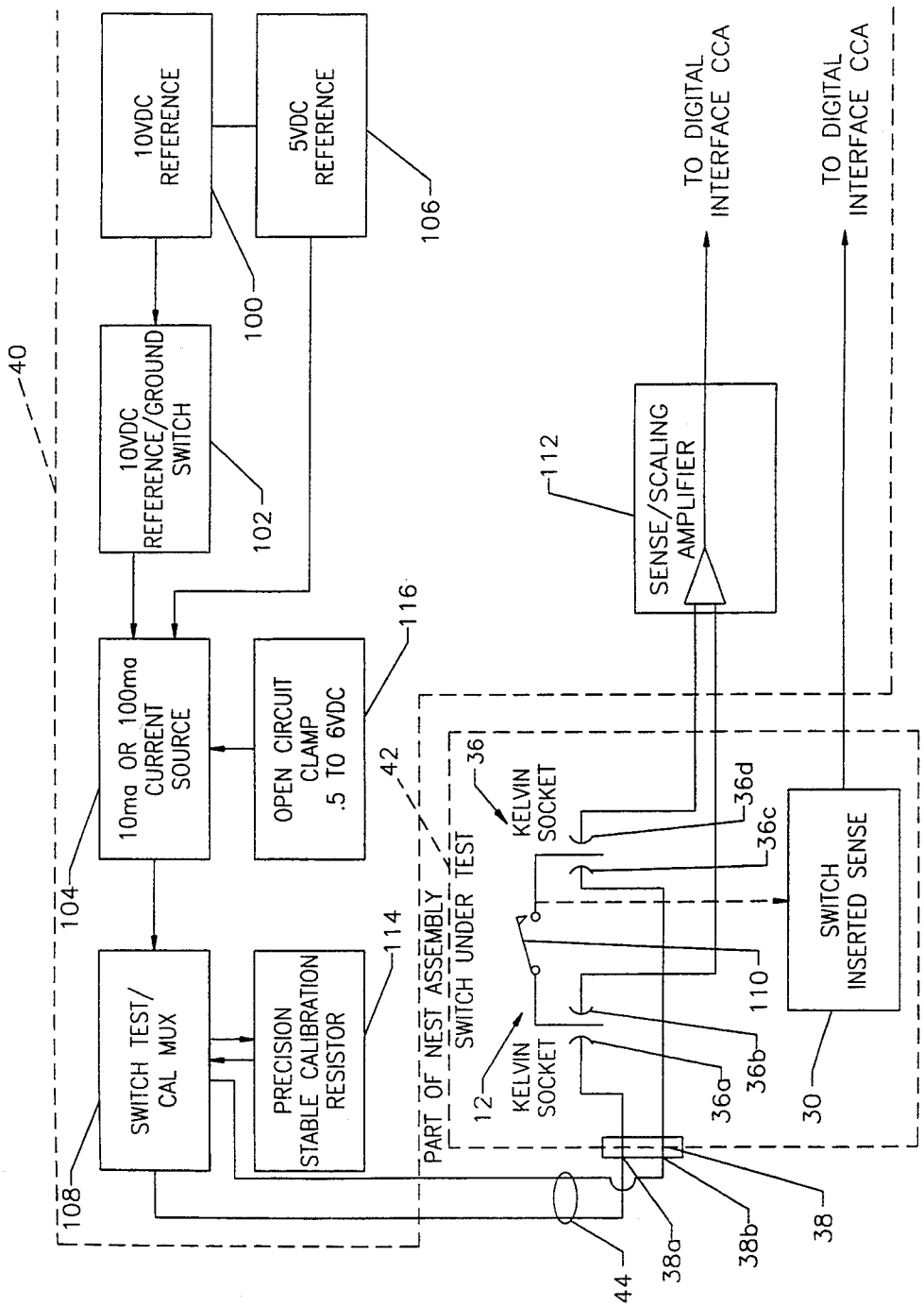
FIG. 3 is a block diagram of the interconnections between the electrical sensing and current source components and the switch nest assembly of the switch testing device shown in FIG. 1.

With reference now to FIG. 3, the operation of the analog interface circuit card 40 in conjunction with the nest assembly 42 will be described. A precision 10 volt DC reference source 100 provides a 10 volt DC output signal to a reference/ground switch 102. The switch 102 supplies either the 10 volt reference signal or a ground signal to a high precision constant current source 104. Likewise, a 5 volt DC reference 106 responsive to the 10 volt DC reference 100 provides a 5 volt DC reference signal to the current source 104.

The high precision current source 104 outputs a high precision switchable 10 milliamp or 100 milliamp current signal to a switch test/calibration mux 108 which is electrically connected through the input and output ports 38a and 38b of the interface connector 38 to the kelvin socket 36 of the switch nest 42. Only four contacts of the interconnect 44 are shown in FIG. 3, two between the switch 12, the mux 108 and two between the switch 12 and the analog interface circuit card 40, it being understood that the interconnect 44 actually contains all of the contacts mentioned above. The 10 milliamp or the 100 milliamp output from the current source 104 is user selectable. For example, a silver contact switch may require a 100 milliamp current while a gold contact switch may require a 10 milliamp current. The switch 12 under test has a movable contact 110 as shown in FIG. 3 and is inserted into the kelvin socket 36.

The kelvin socket 36 is a device used for high accuracy measurements of an unknown resistance. Such measurements are accomplished by connecting the current from the current source 104 to the terminals 36a and 36c of the kelvin socket 36 through the mux 108 and by sensing the voltage across the movable contact 110 using the contacts 36b and 36d of the kelvin socket 36. Thus, the sensing of the voltage across the movable contact 110 is independent of any voltage drops due to contact resistances between the switch 12 and the connections from the current source 104. Accordingly, the kelvin socket 36 allows a high accuracy reading and, therefore, a high accuracy determination of contact resistance.

A sense/scaling amplifier 112 connects to each side of the switch 12 through the terminals 36b and 36d of the kelvin socket 36, senses the voltage appearing across the movable switch contact 110, amplifies this voltage, and transmits this voltage to the digital/microcomputer interface card 34. In this manner, the current source 104 supplies a constant current signal through the switch test/calibrator mux 108 to the switch 12 under test. When the switch contact 110 is open, the sense/scaling amplifier 112 measures a high voltage across the switch contact 110 thereby indicating an open switch condition. However, when the movable switch contact 110 is closed, the sense/scaling amplifier 112 detects a low voltage across the switch contact thereby indicating the switch contact is in a closed position. The voltage information is sent to the digital/microcomputer interface card 34 which calculates the resistance in the movable switch contact 110 during switch operation by dividing the sensed voltage across the movable contact 110 by the known constant current value. Based upon the voltage across terminals 36b and 36d, the digital/microcomputer interface card 34 also determines the precise moment at which the movable switch contact 110 switches between the normally closed and the normally open positions or vice versa.

Also included in the analog interface card 40 is a precision stable calibration resistor 114 which is used to calibrate the current source 104 in ASTS 10. During calibration, both the current source 104 value, or level, and the zero current condition (offset) are measured. For both readings, the socket terminal 36a is shorted to the socket terminal 36b and the socket terminal 36c is shorted to the socket terminal 36d with the shorting pins contained on a calibration reference gauge assembly (described below). The gauge assembly automatically shorts the kelvin sockets once the reference gauge assembly is clamped into the nest assembly 42 in place of a switch. While calibrating, the resistor 114 is switched across the current source 104 to produce a voltage proportional to the actual current value being produced by the current source 104. The following details the two measurements performed during calibration.

First, a zero current calibration cycle is run during which the switch 102 is set to its ground position which connects the input of the current source 104 to ground. At the same time, the terminals 36a and 36b are shorted together and the terminals 36c and 36d are shorted together by the reference block. Accordingly, supposedly zero current is supplied by the current source 104 to the precision calibration resistor 114, which is now connected by the mux 108 across terminals 36b and 36d, so that any voltage sensed across the terminals 36b and 36d is an offset error. This error is read by the digital/microcomputer interface card 34 and is used thereafter to correct the readings acquired during testing of the switch 12. Then, switch 102 is set to the 10 volt reference level thus enabling the current source 104 to produce a desired test current. As before, the terminals 36a and 36b are shorted together and the terminals 36c and 36d are shorted together. Accordingly, the voltage across the resistor 114 as sensed across the terminals 36b and 36d, divided by the known value of the precision resistor 114, yields the precise value of the current supplied by the current source 104. During actual switch testing, this precise current value is used by the digital/microcomputer interface card 34, in conjunction with the voltage sensed across the terminals 36b and 36d, to calculate the contact resistances of the switch 12.

An open circuit clamp 116, configurable from 0.5 to 6 volts DC, is connected across to the current source 104 to limit the voltage across the switch 12. The purpose of this clamp 116 is to provide specific open circuit test conditions per user requirement.

Figure 4:
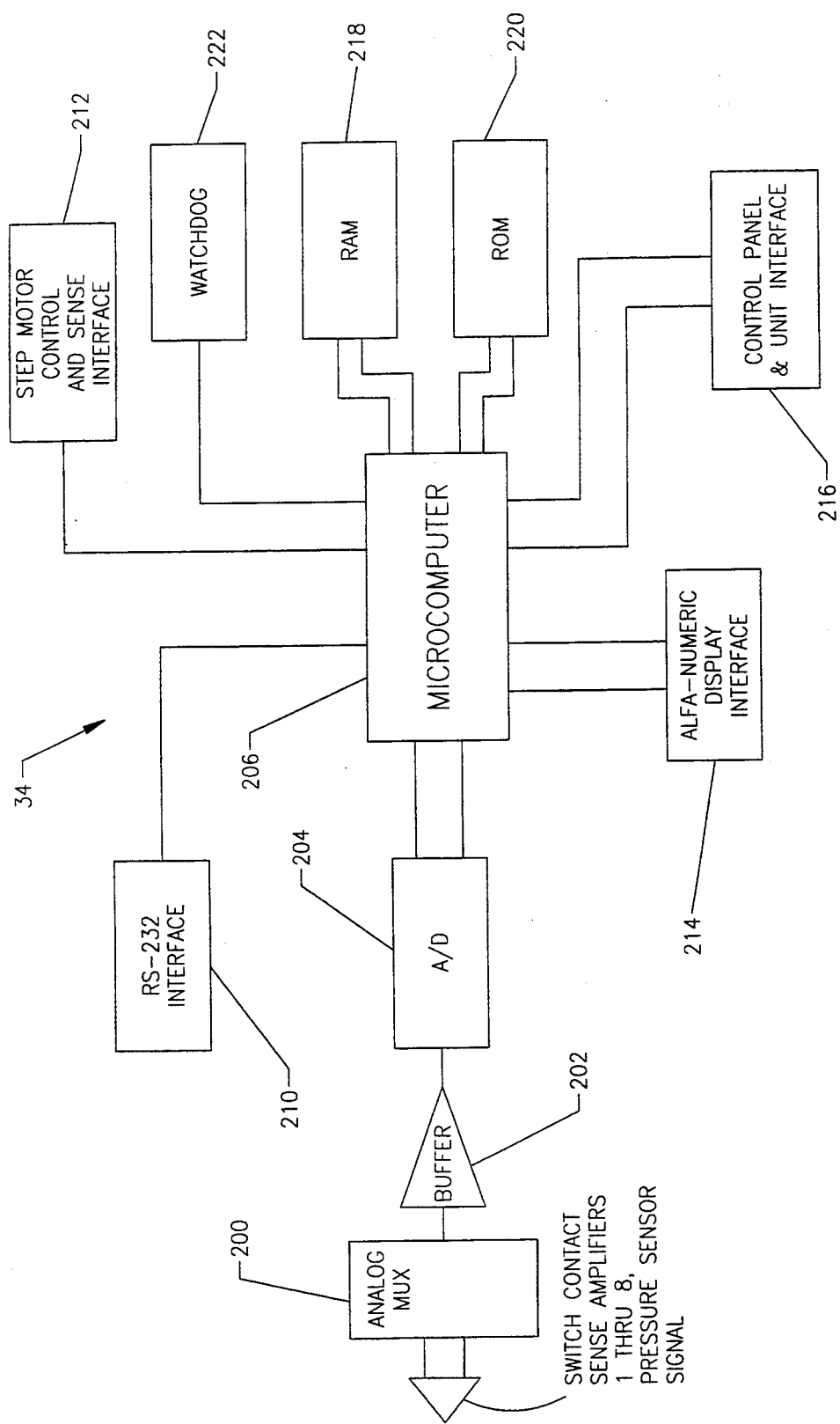
FIG. 4 is a block diagram of the digital microcomputer interface card included within the switch testing device of FIG. 1.

Referring now to FIG. 4, a block diagram of the digital/microcomputer interface card 34 is shown. Sense inputs from up to 8 sense amplifiers (similar to the sense/scaling amplifier 112 shown in FIG. 3) and the pressure sensor 56 are delivered to an analog mux 200. The output of the mux 200 is supplied to a buffer 102 which is connected to an A/D converter 204. The A/D converter 204 converts the analog sense and pressure sensor inputs to digital values which are then delivered to a microcomputer 206, which performs all switch characteristic calculations to determine whether the switch falls within predetermined specifications. The microcomputer 206 connects to an RS-232 interface 210 for connection to the RS-232 serial interface card 64, to a stepper motor control and sense interface 212 for connection to the stepper motor controller 46, to an alpha-numeric display interface 214 for connection to the alpha-numeric display 60, and to a control panel and the unit interface 216 for connection to the control panel lights and switches 62. The microcomputer 206 also connects to a RAM 218 and a ROM 220 which are responsible for microcomputer control and data storage. A watchdog timer 222 is connected to the microcomputer 206 and prevents computer lockup in the presence of extraneous noise or a software execution malfunction. If the timer is not systematically retriggered so that the timer times out, the microcomputer 206 performs a reinitialization routine as is well known in the art.

Figure 5A:
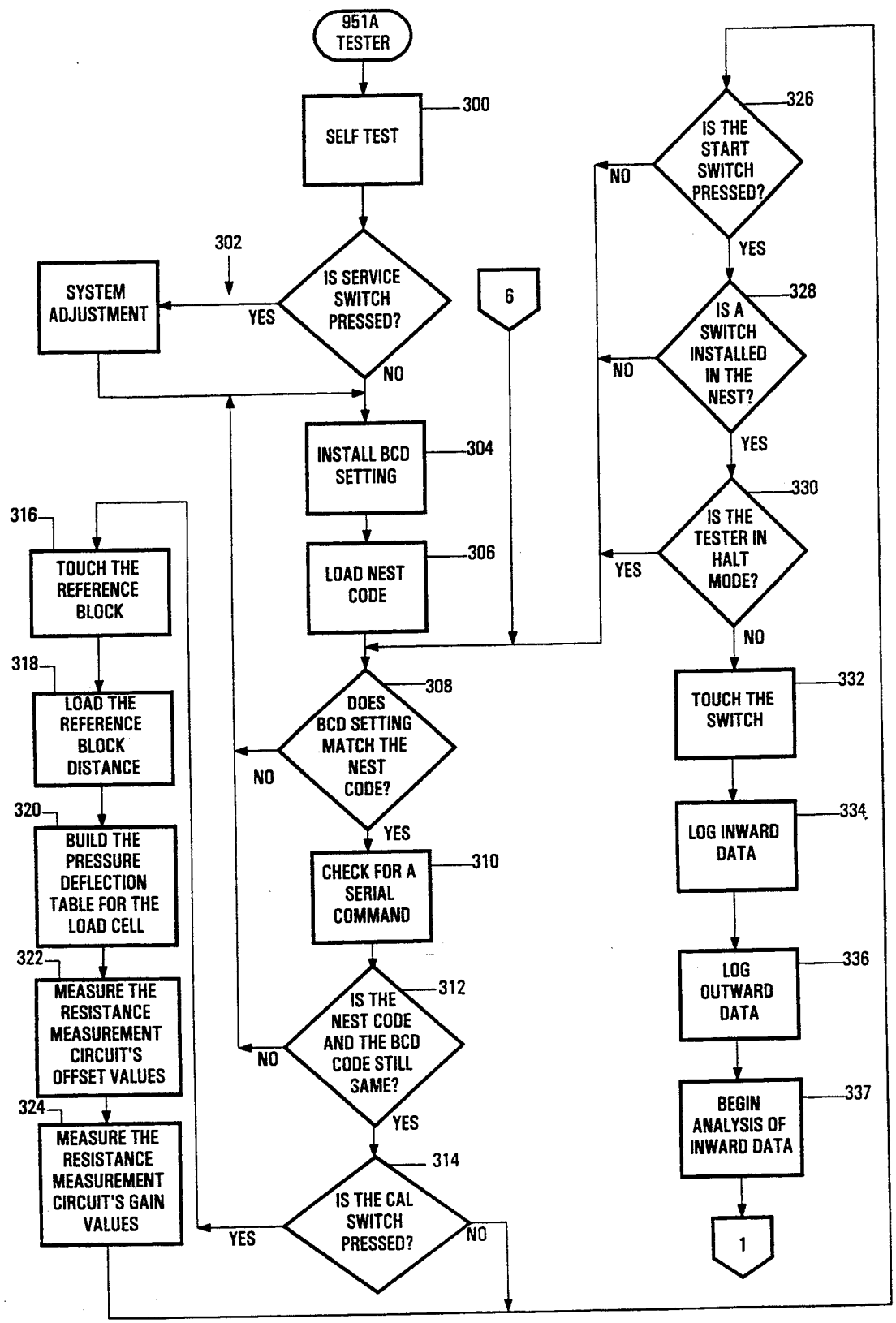
FIG. 5a–5e is a functional flowchart of a program which can be implemented by the microcomputer shown in FIG. 3 in the testing of switches.

With reference to FIGS. 5a–e, the operational procedure and sequence for the preferred embodiment of the ASTS 10 will be discussed. As indicated in FIG. 5a, upon power-up of the ASTS 10, a block 300 performs a series of self-tests to verify that the ASTS 10 is functioning properly. These self-tests include program check sum, CPU ROM, and data storage RAM tests. If any of the self-tests fail, a warning or error message is displayed on the operator's alpha-numeric display 60.

If the service switch 68 is active, a block 302 provides a means to test and adjust the zero offset of the pressure sensor 56 to calibrate the absolute pressure calibration of the pressure sensor 56 by the use of an external gauge, and to determine the exact current levels of the current source 104 and offsets of the sense amplifier 112 offsets. A binary coded decimal (BCD) setting is installed by a block 304. This BCD setting is developed from the test configuration switch 67 which identifies the type of switch to be tested. A block 306 loads the afore-mentioned nest code, which is hardwired into the switch nest 42 and identifies the specific switch nest 42 to be used for the test, into the microcomputer 206. The nest code is obtained through the interconnect 44.

The nest code and the BCD setting are then compared by a block 308 to determine if they match. If they do not, the ASTS 10 returns to the block 304 to allow the operator to enter a new BCD setting and informs the operator through the control panel 62 that an error has occurred.

If the BCD setting and the nest code match, a block 310 checks for a serial command from, for example, the PC 66. A block 312 then determines if the BCD code and the nest code still match and, if so, a block 314 determines whether a calibration switch on control panel 62 is pressed. If the calibration switch is pressed, the ASTS 10 enters the calibration mode.

The calibration mode is used to obtain both mechanical and electrical measurement references which are necessary whenever the ASTS 10 is first turned on or when a new switch nest 42 is installed in the ASTS 10. In the preferred embodiment, the ASTS 10 automatically enters the calibration mode after performing a self test on powering up. Upon entering the calibration mode, a calibration indicator illuminates on the control panel 62 and indicates that the calibration mode is being performed. At this time, the message "install distance reference gauge, press ready when installed" is displayed on the alpha-numeric display 60. The distance reference gauge comprises a certified reference block (not shown) and kelvin socket electrical shorting contacts (not shown) which shorts the terminals 36a and 36b and the terminals 36c and 36d of the kelvin socket 36 of the switch nest 42. The reference block is a precisely ground metal block unique for each switch nest type and has its tip located at an exact distance from a known reference point. When the reference block is inserted in the switch nest 42, a block 316 causes the digital/microcomputer interface card 34 to control the stepper motor controller 46 to actuate the stepper motor 48 which in turn forces the plunger actuator 58 towards the reference block tip. When the plunger actuator 58 touches the tip, the pressure sensor 56 senses a higher pressure thereby indicating that the plunger actuator 58 has reached the tip of the block. Through this process, the ASTS 10 measures the distance from the precision zero reference switch 59 to the tip of the switch reference gauge block. Because the reference gauge block dimensions have been previously loaded into the ASTS 10, such as by the PC 66 block 318, the ASTS 10 then can calculate the exact distance from the zero reference switch 59 to the gauge reference block (or switch) reference point. Typically this gauge reference block reference point is the mounting holes 14 but does not have to be.

Next, a block 320 determines a force/deflection curve for the plunger actuator 58. Since all pressure sensors inherently deflect as they sense force, it is necessary to determine the exact force/deflection curve of the pressure sensor 56 in order to precisely calculate the position of the switch plunger 13 under load. This deflection depends on the force supplied to the switch plunger 13 during test. With this in mind, the stepper motor 48 steps through increments to thereby apply plunger force through the pressure sensor 56 to the reference block. The force sensor 58 measures the amount of force being supplied as the sensor 56 deflection increases incrementally and sends this information to the microcomputer 206. Thus, the deflector of the pressure sensor 56 is noted for plural values of the force sensed by the pressure sensor 56. With this procedure, a force/deflection table can be built for the pressure sensor 56 and stored in RAM 218. Because the reference block is immovable, a true deflection versus pressure curve is logged. Additionally, any other secondary deflections present in the drive mechanism are also accounted for. The force/deflection table is used to determine and correct for the distance errors to 0.0001 inch introduced by pressure sensor 56 and force transducer when calculating the exact location of the switch plunger 13 during the switch testing cycle.

Referring again to FIG. 5a, after the force/deflection table has been loaded and stored in memory, the resistance measurement offset values and gain values are determined by blocks 322 and 324. The kelvin socket electrical shorting contacts of the distance reference block enable the ASTS 10 to calibrate the resistance measurements performed on the switch 12. As aforementioned, during the resistance calibration process, the current source 104 supplies zero current through the shorted kelvin socket 36 in order to detect an offset error voltage at the output of the sense/scaling amplifier 112. Also, current is supplied through the precision stable calibration resistor 114, and the voltage from the sense/scaling amplifier 112 is read and used, together with the valve of the resistor 112, to determine the actual current supplied by the current source 104. Knowing the exact current produced by current source 104 enables the microcomputer 206 to accurately compute switch resistance values during switch testing. As described above, the calibration process corrects all system offsets and hardware deviations so that the switch to be tested is the only unknown.

The calibration cycle can also be initiated whenever desired by pressing a calibration switch on the front panel 62. This feature is useful if the operator suspects the original calibration has been compromised. For example, if the switch nest 42 is loosened and then re-tightened, the original calibration may be invalid and a new calibration cycle is necessary to reestablish calibration. After a nest is changed, the ASTS 10 will automatically enter the calibration mode.

After the calibration cycle has been run or if the calibration switch is not pressed, a block 326 determines whether the test start switch on control panel 62 is pressed, a block 328 tests if a switch 12 is installed in the switch nest 42, and a block 330 determines whether the ASTS 10 is in halt mode accomplished by pressing the halt control on control panel 621. If the start switch is not pressed or a switch is not installed in the nest or the tester is in halt mode, the routine returns to block 308. If, however, the start switch is pressed and a switch is properly installed in the switch nest 42 and the testing ASTS 10 is not in halt mode, a block 332 causes the stepper motor 48 to move the plunger actuator 58 to touch the plunger 13 of the switch 12. At that point, the pressure sensor 56 senses a pressure surge indicating that the plunger actuator 58 has touched the switch plunger 13.

Then, a block 334 causes the stepper motor 48 to be driven in incremental steps to force the switch plunger 13 in an inward motion. Inward electrical, displacement and force data is stored by the microcomputer 206 in the RAM 218 for each of the incremental steps. When the pressure sensor 56 senses a maximum allowable pressure, or when the pressure actuator 58 is advanced 2500 incremental steps, the microcomputer 206 determines that the bottom out position of the plunger 13 has occurred. At this point, a block 336 causes the stepper motor 48 to be driven by incremental steps in the opposite direction so as to release pressure from the switch plunger 13. The block 336 logs all outward switch data and stores this data in the RAM 218. In this manner, data is accumulated for an entire actuation cycle of the switch 12. A block 337 then initiates analyses of this stored data in order to calculate the switch 12 parameters.

The ASTS 10 is capable of testing a large variety of contact form types and channel numbers. Therefore, a single channel, double throw (form C) switch type is selected for the following discussion.

Figure 5B:
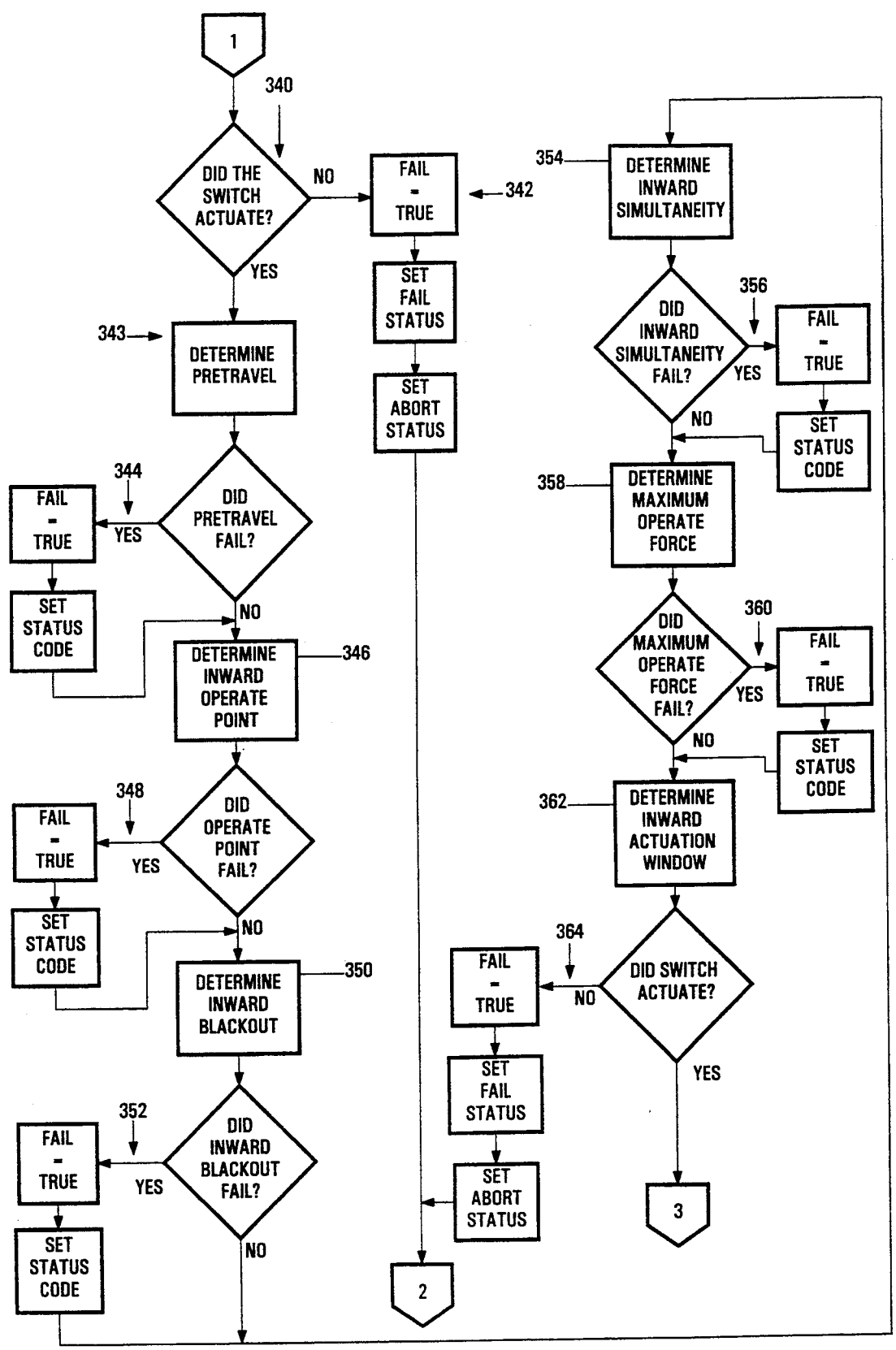

As shown in to FIG. 5b, after the switch 12 has been fully actuated and all the data is logged, the routine analyzes the data stored in the RAM 218 to determine the switch characteristics. A block 340 determines whether the movable switch contact 110 actuated, i.e., whether the movable switch contact 110 transferred positions, upon the inward movement of the switch plunger 13. If not, blocks 342 determine a fail status, set a fail status flag and set an abort status flag to thereby abort further calculations of switch characteristics which are dependent upon actuation of the movable switch contact 110. If actuation of the movable contact 110 occurred on the inward cycle, however, pretravel is determined by a block 343. Pretravel is the distance between the free position, i.e., the position of the switch plunger 13 with no force applied to it, and the operate point of the switch 12 (see FIG. 2). The pretravel is calculated by determining the number of incremental steps traveled by the plunger actuator 58 from the point where a force on the plunger 13 is first detected (i.e. the free position) to the operate point of the switch 12 where the movable has transferred at least once. This calculated pretravel is then compared by blocks 344 to a stored pretravel specification value to determine if the calculated pretravel of the switch 12 failed perform within the specification standards. If a pretravel failure occurs, a fail status flag is set.

Next, the inward operate point of the switch is determined by a block 346. The inward operate point of the switch 12 is the distance between the calibrated reference point to the point where all the contacts of the switch 12 have transferred at least once. In determining this distance, any contact bounce is ignored. The inward operate point, as are all switch event locations, is measured with respect to the mounting holes. The inward operate point is compared by blocks 348 to a corresponding specification value to determine see if the switch passed in that regard. If the operate point failed, a fail status code is set.

Next, a block 350 determines the inward blackout of the switch 12. Inward blackout is defined as the dead band that exists during contact transition. Thus, it is the distance between the location of the plunger 13 when the movable contact 110 just disconnects from normally closed contact position and the location of the plunger 13 when the movable contact 110 just connects its final contact position (i.e., normally open contact position). The points of disconnection from one contact and connection to the other contact are determined by sensing current flow through the switch 12 and the distance between those points is determined by the number of steps required of the plunger actuator 56 to travel between those points. (As mentioned previously, blackout is not determined for single pole, single throw switches.) Blocks 352 determine if inward blackout failed to comply with the stored specification and, if so, a fail status flag is set.

A block 354 then determines inward simultaneity. (Again as mentioned previously, simultaneity is a test only performed when a multiple contact switch is being tested.) Simultaneity measures the difference in the plunger 13 position upon the actuation of a reference contact set to the actuation of another contact set within the switch 12. As an example, for a two contact set switch (such as a double channel, double throw switch), there is one simultaneity measurement, while for a three contact set switch (such as a triple channel, double throw switch) there is three simultaneity measurements, etc. One set of contacts of the switch 12 is selected as a reference set and the travel distance required of the plunger actuation 58 to actuate each of the other sets of contacts with respect to the reference set is measured. Blocks 356 test the simultaneity readings to see if there is a simultaneity failure. A fail status flag is appropriately set.

A block 358 determines the maximum operate force required to operate the switch 12. The maximum operate force is defined as the maximum force measured during pretravel of the plunger 13. Thus, it is the largest force applied to the switch plunger 13 when the plunger 13 is at any position between the free position and the operate point. Blocks 360 compare the measured maximum operate force to the stored specifications and a fail status flag is appropriately set if the maximum operate force does not meet the specifications.

A block 362 determines the inward actuation window The inward actuation window is defined as the plunger 13 distance between the point at which the first switch contact set transfers positions and the point where all contact sets of the switch 12 have completely transferred positions. Thus, the actuation window measures the distance that is required for the plunger 13 to travel from the point where a first switch contact leaves the normally open position to the point where all contacts have actuated to the normally closed position and all switch bounce has subsided. Switch bounce is determined by analyzing the inward data from the bottom out point, backwards to the operate point, or the outward data from the free position, backwards to the reset point. The first indication of a change in the contact is defined as the last bounce data point. (In the case of a single pole, single throw switch, the actuation window is the distance between the point where the movable contact makes its first connection with the stationary contact and the point where bounce subsides or vice versa.)

At this point, blocks 364 again determine if the switch contact actuated fully and set a failure and an abort status if full actuation did not occur.

Figure 5C:
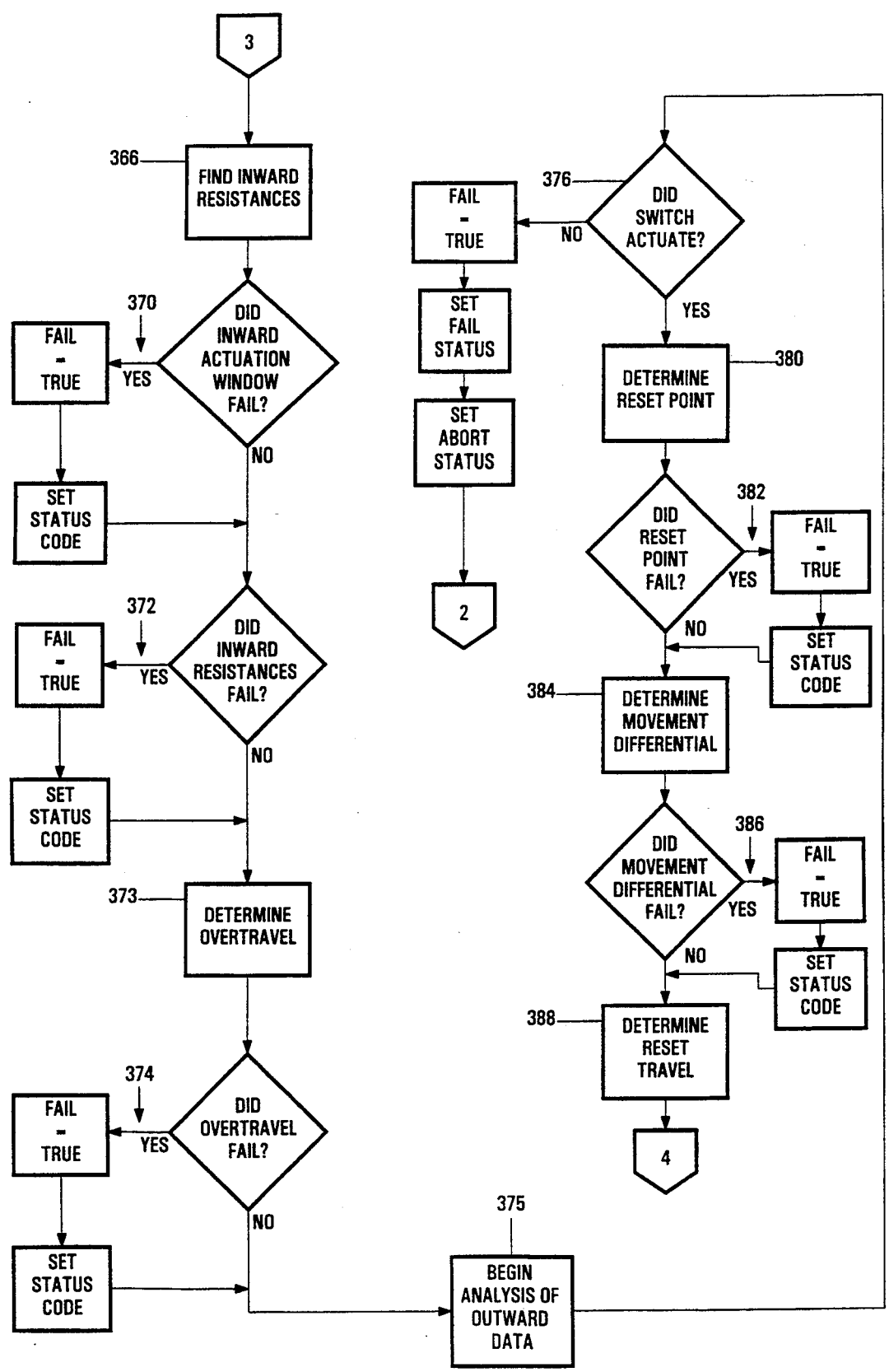

Otherwise, as shown in FIG. 5c, the inward resistances of the movable contact 110 are determined. Resistances are determined in the microcomputer 206 by dividing the voltage appearing across a contact set (for example, the movable contact 110), as measured by the sense/scaling amplifier 112, by the known current supplied by the current source 104 as determined during the calibration cycle. In the preferred embodiment, the ASTS 10 determines the maximum, minimum and average inward switch resistances measured between the plunger 13 position at which the first contact position change occurs and the bottom out of the switch plunger 13 during inward motion, and determines the maximum, minimum and average outward switch resistances measured between the first contact position change and the free position during outward motion.

Next, blocks 370 and blocks 372 determine whether the inward actuation window and the inward resistance parameters are within the prescribed specification values, respectively. If not, a failure status code is set.

Next, a block 373 determines overtravel. Overtravel is defined as the distance between the point where all contacts have transferred at least once and the point where bottom out of the movable contact occurs. Blocks 374 determine whether overtravel meets its corresponding specification and, if not, a fail status flag is set.

A block 375 then initiates analyses of the outward data. Blocks 376 check to see if the switch actuated during outward motion of the plunger 13, setting fail and abort status flags if proper actuation did not occur.

If switch actuation did occur on the outward travel of the plunger 13, a block 380 then determines the reset point of the switch 12. The reset point is an operate point during outward travel of the plunger 13 and is defined as the distance between the point where all contacts of the switch have transferred back to their original position at least once (i.e., ignoring contact bounce) and the reference point (or, in the case of a single pole, single throw switch, the distance between the point where the movable contact opens and the reference point). Blocks 382 determine whether the measured reset point is within reset point specifications and, if not, a fail status code is set.

A block 384 determines the movement differential of the movable contact 110. Movement differential is defined as the difference in distance between the inward operate point of the switch 12 and the outward operate point or reset point (i.e., the distance between these points as shown in FIG. 2). Thus, it is the difference in plunger 13 position between where all contacts have switched from their original to their final position during inward travel of the plunger 13 to where all contacts have transferred back from their final position to their original position during outward travel of the plunger 13. (In the case of a single pole, single throw switch, movement differential is the distance between the point where the movable contact makes contact with its stationary contact during inward motion and the point where the movable contact breaks contact with its stationary contact during outward motion. Also, current flow through the contacts is sensed to determine when the movable contact 110 leaves one position and arrives at another, and the number of steps of plunger actuator 58 travel is used to determine distances.) The reset point is sensed by sensing current flow through the contacts of the switch 12 and by keeping track of the position of the plunger actuator 58. The free position is detected by use of the output from the pressure sensor 56 and, by plunger actuator position. Blocks 386 determine whether the movement differential failed to comply with the stored specifications and, if not, a fail status code is set.

Figure 5D:
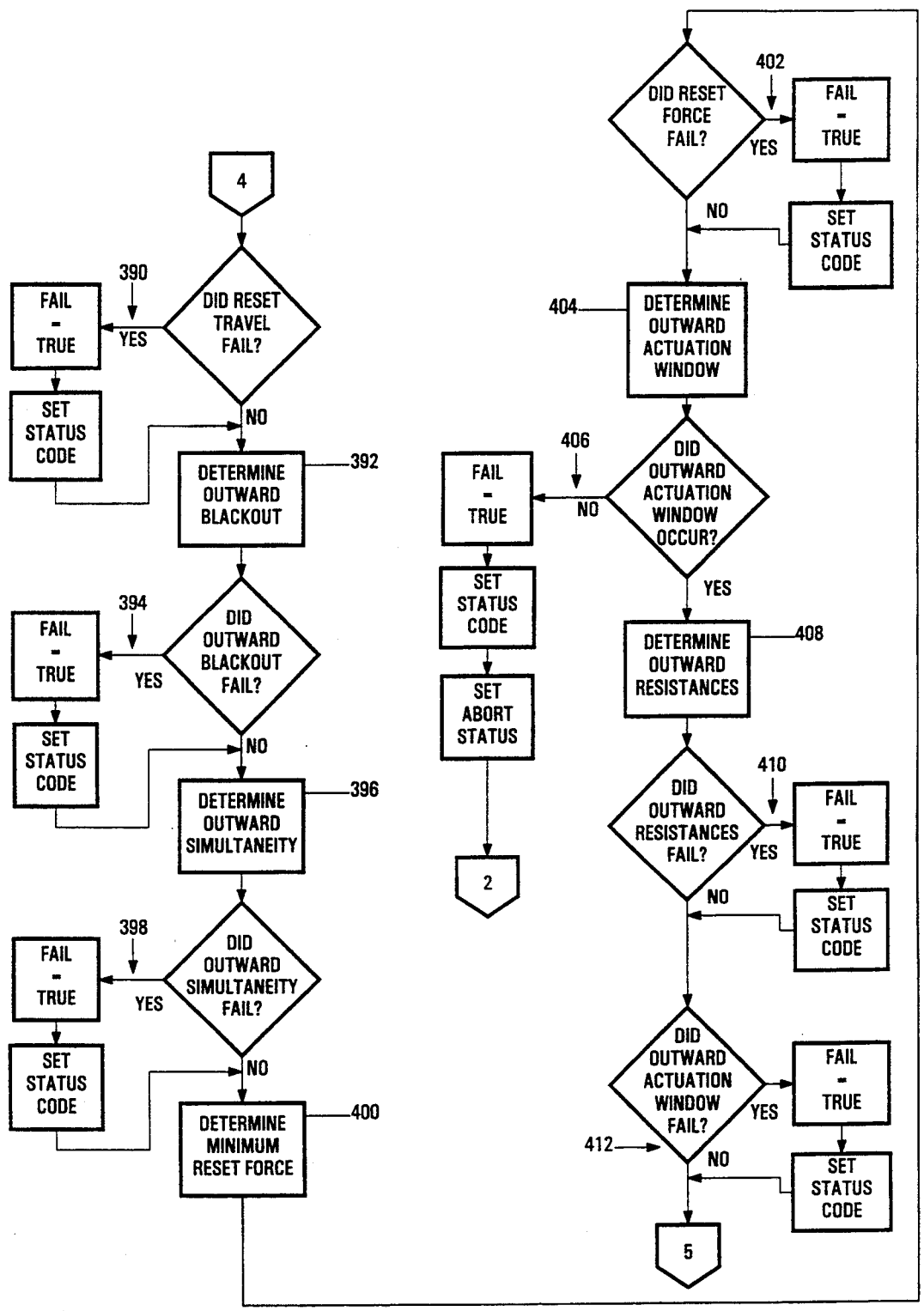

Next, a block 388 determines reset travel. Reset travel is the distance from the plunger 13 reset point to the plunger 13 free position (i.e., the distance between these points in FIG. 2). As indicated in FIG. 5d, blocks 390 compare the actual reset travel of the switch 12 to the stored specification to see if the actual reset travel falls within allowable ranges. If not, a failure status code is set.

Next, blocks 392, 396, 400 and 404 determine outward blackout, outward simultaneity, minimum reset force, and the outward actuation window, respectively. These values are determined substantially as explained with regard to the corresponding inward values except they are determined during the outward travel of the switch plunger 13 and, as such, are measures of the switch characteristics when the switch contact 110 returns from its final position to its original position upon deactivation of the switch 12. Each of these values as measured is compared with corresponding specification values to see if they fall within the allowable ranges. If any are outside the specification values, a failure code is set. These comparison routines are indicated generally by blocks 394, 398, 402, and 412, respectively.

After the block 404 determines the actuation window, blocks 406 determine whether an outward actuation window actually occurs and, if not, a fail status code is set and an abort code is set. If, however, an actuation window does occur, a block 408 determines outward resistances. Outward resistances are determined from the first contact change, plus blackout, to the point where the switch plunger 13 free position occurs. Blocks 410 compare the measured outward resistances to the specification values and a fail status code is set if the measured outward resistances do not fall within the allowable range.

Figure 5E:
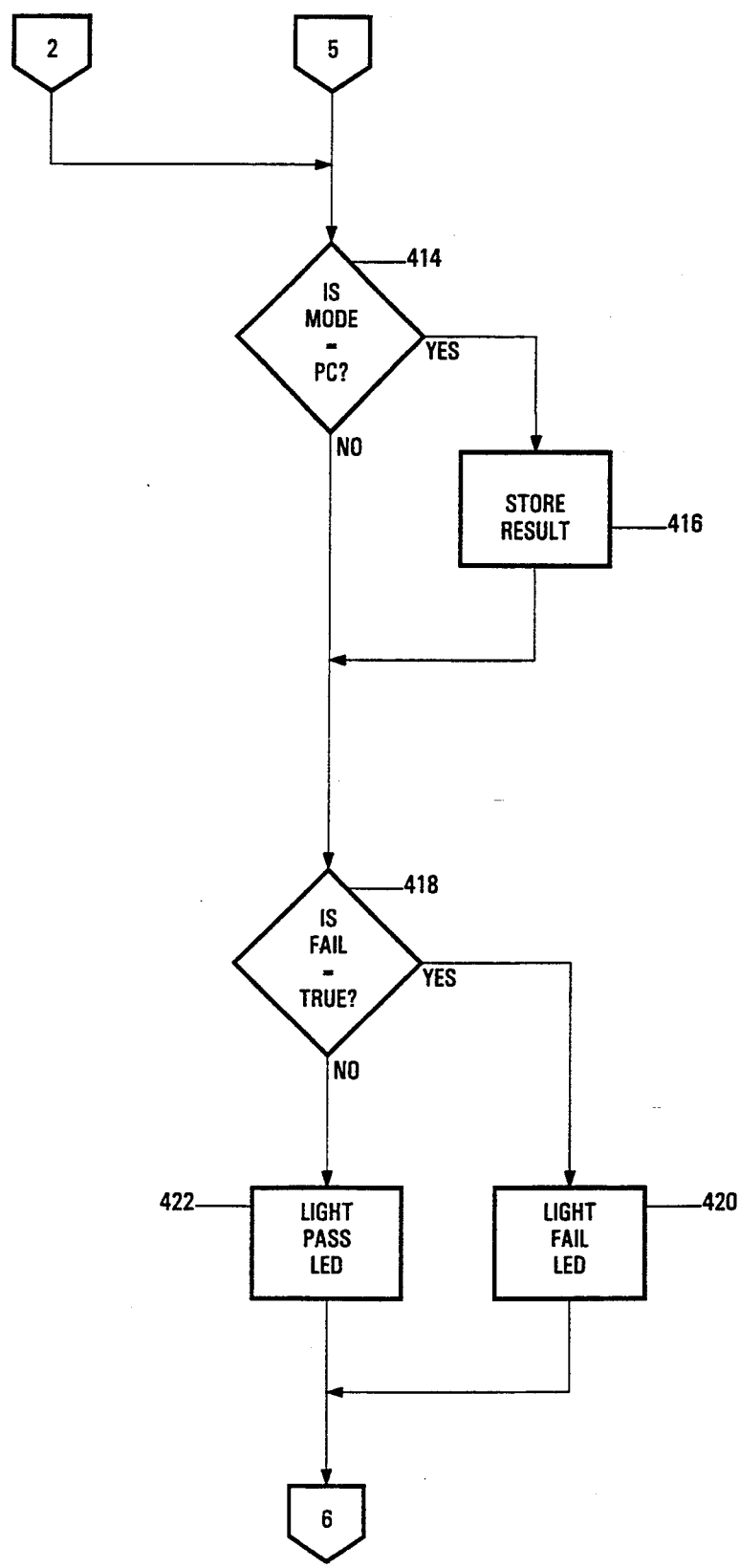

As shown in FIG. 5e, after all the tests have been performed on the data stored in the RAM 218, or if an abort status has been set as previously described, a block 414 tests to see if the ASTS 10 is in PC mode. The ASTS 10 has three operating modes including (1) a local mode in which a past/fail indication is provided during stand alone operation, (2) a PC mode in which a PC 66 interacts with the ASTS 10 and is used to configure switch test parameters and view stored tests results in an operator controlled format, and (3) an engineering mode in which the detailed tested data for every incremental step of switch plunger 13 travel is downloaded to the PC for viewing. If a PC 66 is not available, the ASTS 10 will only operate in local mode. The desired mode is operator selectable. If the ASTS 10 is in PC mode, a block 416 saves the switch test results which can then be downloaded to the PC 66. Test result data for up to thirty-two switches can remain in memory until the PC 66 interrogates the ASTS 10 under interrupt control. Once the data is downloaded to the PC 66, the memory 218 is cleared.

Then a block 418 checks to see if a fail status code has previously been set. If so, a block 420 lights the fail LED on the panel 62, and sends the highest priority fail code, to the alpha-numeric display 60 for operator viewing. If, however, no fail code has been set indicating that the switch has passed all such tests, a block 422 lights the pass LED.

At this point, the switch test is complete and the routine returns to block 308 in FIG. 5a to await either another switch to be inserted in the switch nest 42 or another operation by the operator. At this time, the operator can either insert a new switch 12 or a new switch nest 42, change specification data, or run a calibration cycle.

It should be noted that although this routine has been generally described with respect to a single channel single contact set switch, the ASTS 10 can be configured to test switches having up to eight channels, i.e., eight pairs of switch inputs and outputs, measuring the switch 12 characteristics as defined above for each individual contact set.

As indicated hereinbefore, it is possible to connect the digital/microcomputer interface card 34 through the RS-232 serial interface card 64 to the PC 66. This enables the ASTS 10 to download all the test data acquired by the microcomputer 206 to the personal computer 66 where it can be displayed or processed in any desirable format. This operation allows the operator, for example, to determine the exact values of each of the switch characteristics to determine if there was more than one switch test failure. It is also possible to route multiple ASTS's 10 to the same personal computer 66 so that a single operator can control multiple test stations and perform statistical process control monitoring for a complete production area. Such a configuration is indicated in FIG. 1. Finally, instead of displaying the actual switch test results, the raw data as acquired by the microcomputer 206 can be downloaded to the PC 66 as performed in the engineering mode discussed above, thereby allowing the operator to view the data acquired during each incremental step of the stepper motor 48, if so desired. The PC 66 also allows the test data to be viewed, analyzed, archived and printed. The ASTS 10 stores test criteria for up to 16 different switch configurations and data for up to 32 sets of test results.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An apparatus for testing a switch having an actuating plunger, the switch undergoing a switch event in response to actuation of the actuating plunger, the apparatus comprising:

holding means for holding a switch at a predetermined location;

force applying means for applying a force to an actuating plunger of a switch to actuate the switch;

force sensing means coupled to the force applying means for sensing the force applied to the actuating plunger during actuation of the switch; and mechanical displacement determining means coupled to the force applying means for determining mechanical displacement of the actuating plunger of the switch at a switch event;

wherein the force applying means has a force versus displacement characteristic, and the mechanical displacement determining means includes correcting means for automatically correcting for displacement errors resulting from the force versus deflection characteristic of the force applying means.

2. The apparatus of claim 1 further including coupling and electrical characteristic measuring means for coupling to the switch and for measuring electrical characteristics of the switch during actuation of the actuating plunger.

3. The apparatus of claim 3 further including detecting means for detecting the force versus deflection characteristic of the force applying means.

4. The apparatus of claim 3 wherein the force applying means includes a stepper motor to drive a force transducer in an incremental manner so as to apply force to an actuating plunger of a switch.

5. The apparatus of claim 4 wherein the coupling and electrical characteristic measuring means includes means for measuring data for each displacement increment of the stepper motor.

6. The apparatus of claim 5 wherein the mechanical displacement determining means uses the data measured by the coupling and electrical characteristic measuring means to recognize the occurrence of the switch event and thereby to determine the mechanical displacement of the actuating plunger at that event.

7. The apparatus of claim 6 wherein the coupling and electrical characteristic measuring means includes means for measuring the electrical characteristics for any number of channels of the switch and the mechanical determining means determines the mechanical displacement of the actuating plunger at the switch event with respect to any number of the channels of the switch.

8. The apparatus of claim 7 wherein the holding means includes a slidable cylindrical pin having an end tapered along an axis of the pin, the tapered end capable of insertion into a mounting hole of a switch so that the pin engages a housing of the switch and so that the axis of the pin intersects the center of the location hole.

9. The apparatus of claim 8 wherein the holding means further includes a movable clamp for applying pressure to the switch which, in conjunction with the slidable cylindrical pin, holds the switch substantially immovable at a predetermined location.

10. The apparatus of claim 9 wherein the coupling and electrical characteristic measuring means includes a signal source adapted to be coupled to the switch to provide an electrical signal to the switch and a sensor adapted to be coupled to the switch to measure the electrical resistance properties of the switch.

11. The apparatus of claim 10 wherein the coupling and electrical characteristic measuring means further comprises means, including a kelvin socket, for electrically connecting signal source and the sensor to the switch to enable more accurate resistance measurements.

12. The apparatus of claim 11 wherein the coupling and electrical characteristic measuring means includes means for measuring the minimum, maximum and average electrical resistance of the switch during actuation of the actuating plunger.

13. The apparatus of claim 2 wherein the force applying means includes a stepper motor to drive a force transducer in an incremental manner so as to apply force to an actuating plunger of a switch.

14. The apparatus of claim 13 wherein the coupling and electrical characteristic measuring means includes means for measuring data for each displacement increment of the stepper motor.

15. The apparatus of claim 14 wherein the mechanical displacement determining means uses the data measured by the coupling and electrical characteristic measuring means to recognize the occurrence of the switch event and thereby to determine the mechanical displacement of the actuating plunger during that event.

16. The apparatus of claim 2 wherein the coupling and electrical characteristic measuring means includes means for measuring the electrical characteristics for one or more channels of the switch and the mechanical determining means determines the mechanical displacement of the actuating plunger at the switch event with respect to one or more of the channels of the switch.

17. The apparatus of claim 1 wherein the force applying means has a force versus deflection characteristic, and the mechanical displacement determining means includes correcting means for automatically correcting for displacement errors resulting from the force versus deflection characteristic of the force applying means.

18. The apparatus of claim 17 further including detecting means for detecting the force versus deflection characteristic of the force applying means.

19. The apparatus of claim 1 wherein the holding means includes a slidable cylindrical pin having an end tapered along an axis of the pin, the tapered end capable of insertion into a mounting hole of a switch so that the pin engages a housing of the switch and so that the axis of the pin intersects the center of the mounting hole.

20. The apparatus of claim 19 wherein the holding means further includes a movable clamp for applying pressure to the switch which, in conjunction with the slidable cylindrical pin, holds the switch substantially immovable at a predetermined location.

21. An apparatus for testing a switch having a switch input port, a switch output port, and at least one contact movable to interconnect the switch input port and the switch output port, the apparatus comprising:

holding means for holding the switch in a predetermined location;

force applying means for applying a force to the switch to actuate the contact;

force measuring means coupled to the force applying means for measuring the force applied to the switch;

supplying means for supplying a first electrical signal to the switch;

detecting means for detecting a second electrical signal from the switch; and determining means coupled to the force measuring means and to the detecting means for determining characteristics of a switch based upon the force applied to the switch and upon at least one of the electrical signals;

wherein the supplying means includes a signal source adapted to be coupled to the switch to provide an electrical signal to the switch and wherein the detecting means includes a sensor adapted to be coupled to the switch to measure the electrical resistance properties of the switch when the contact interconnects the switch input port and output port.

22. The apparatus of claim 21 wherein the detecting means further comprises means, including a kelvin socket, for electrically connecting the sensor to the switch to enable more accurate resistance measurements.

23. The apparatus of claim 22 wherein the detecting means includes means for measuring the minimum, maximum and average electrical resistance of the switch during actuation of a switch actuating plunger.

* * * * *

UNITED STATES PATENT AND TRADEMARK OFFICE
CERTIFICATE OF CORRECTION

PATENT NO.   :   5,388,467
DATED        :   February 14, 1995
INVENTOR(S)  :   Jereb et al.

It is certified that error appears in the above-identified patent and that said Letters Patent is hereby corrected as shown below:

Column 18:

In claim 3, line 1, delete "3" and substitute therefor --1--.

Signed and Sealed this

Seventeenth Day of October, 1995

Attest:

BRUCE LEHMAN

Attesting Officer

Commissioner of Patents and Trademarks